3,324,194
PROCESS FOR THE SEPARATION AND
PURIFICATION OF ETHYLENE
Masaaki Kanbayashi and Masaaki Takahashi, Nakoso-shi, Japan, assignors to Kureha Kagaku Kogyo Kabushiki Kaisha, Tokyo, Japan
No Drawing. Filed Oct. 5, 1964, Ser. No. 401,675
Claims priority, application Japan, Oct. 7, 1963, 38/52,467
5 Claims. (Cl. 260—677)

The present invention relates to process for the separation and purification of ethylene, more particularly relates to a process for the separation and purification of ethylene from a thermally-cracked gaseous mixture containing acetylene, ethylene, methane, hydrogen, carbon monoxide, carbon dioxide and higher acetylenic and olefinic hydrocarbons and produced by the thermal-cracking of hydrocarbons.

As the process for the separation and purification of ethylene from the thermally-cracked gaseous mixture, various methods such as low-temperature processing, absorbing and solvent-absorbing have been industrially employed. However, the disadvantages which are common in these methods are the fact that a complicated apparatus and a high cost are necessary. For example, it is impossible to completely and efficiently separate ethylene from the thermally-cracked gaseous mixture, because in the low-temperature processing, a cooling must be carried out until the processing temperature is reached to less than boiling point of ethylene and in the solvent absorbing, the selectivity of solvent for ethylene is poor. On the other hand, the attempt for which the separation and purification of ethylene only from the thermally-cracked gaseous mixture is carried out by a selective chemical reaction in place of the above physical separating methods has not been almost carried out.

We have now found that when the thermally-cracked gaseous mixture is reacted with hydrogen fluoride ethylene contained in the mixture can be only selectively reacted with hydrogen fluoride to form ethyl fluoride, that ethyl fluoride is easily separated from the thermally-cracked gaseous mixture for example by a partial condensation or solvent absorption method because ethyl fluoride formed has a considerably higher boiling point than that of ethylene and also the solubility for organic solvent of ethyl fluoride is high, that the ethyl fluoride separated can be thermally decomposed into ethylene and hydrogen fluoride and also the hydrogen fluoride can be easily separated from ethylene due to the difference between the boiling points of them and that as a result a specially pure ethylene can be obtained.

According to the present invention, therefore, we provide a process for the separation and purification of ethylene from gaseous mixture containing ethylene and produced by the thermal cracking of hydrocarbons, characterized in that a thermally-cracked gaseous mixture containing acetylene, ethylene, methane, hydrogen, carbon monoxide, carbon dioxide and higher acetylenic and olefinic hydrocarbons is reacted with hydrogen fluoride to form ethyl fluoride, the ethyl fluoride formed is separated from the thermally-cracked gaseous mixture, the ethyl fluoride separated is thermally decomposed into ethylene and hydrogen fluoride and then the ethylene is recovered and also the hydrogen fluoride is recyclicly used for the above reaction of the thermally-cracked gaseous mixture with hydrogen fluoride.

According to the present invention, a highly pure ethylene can be separated and obtained from the thermally-cracked gaseous mixture having any concentration of ethylene with a very simple apparatus and a cheap cost. For example, the process of the present invention is benefitably applicable for the recovery of ethylene from a gas containing a low concentration of ethylene or for the production of highly pure ethylene from a crude ethylene containing 90% or more of ethylene. The process of the present invention is useful for the separation of ethylene from a gaseous mixture which is produced by the thermal cracking of hydrocarbons and contains a lower aliphatic saturated or unsaturated hydrocarbons such as methane, ethane, ethylene, acetylene, propane, propylene, butane and butylene and others, namely hydrogen, carbon monoxide, carbon dioxide and so on. Since propylene and butylene have a possibility of forming their corresponding fluoride or lower polymer, however, it is preferable to use a raw gaseous material of which these gases are not contained.

One embodiment of the process of the present invention will be explained in detail as follows:

A gas containing ethylene of low concentration is introduced into a first reactor which was previously charged with a liquid hydrogen fluoride and further a liquid or gaseous hydrogen fluoride is continuously introduced into the reactor in a quantity of about equi mol. of that of the above introduced ethylene whereby the gas containing ethylene of low concentration is contacted with the liquid or gaseous hydrogen fluoride to effect the reaction of hydrogen fluoride with only ethylene in the gas and thus ethylene may be separated as ethyl fluoride from the first reactor.

The reaction in the first reactor may be continuously carried out at a temperature of $-30°$ C. to $150°$ C. and under a pressure of 0 to 30 kg./cm.$^2$ (gauge). A lower temperature is not benefitable because the reaction velocity is slow. On the other hand, a higher temperature is not preferably because a side reaction such as a polymerization of ethylene is occurred. The pressure may be mainly selected depending upon the concentration of ethylene in the raw gas and the reaction may be preferably carried out under a high pressure in case the concentration of ethylene is low. The reaction may be sufficiently proceeded in absence of catalyst, but the use of catalyst such as metal fluoride is effective in view of the increasing of reaction velocity.

Ethyl fluoride which is withdrawn from the first reactor is separated and purified in a first separator by a suitable known method such as a partial condensation or a solvent absorption method and then the purified ethyl fluoride is thermally cracked into ethylene and hydrogen fluoride in a second reactor. The residual gas which is separated from the first separator is optionally used a fuel or a raw chemical material. For example, the residual gas containing acetylene, methane, carbon monoxide, carbon dioxide and hydrogen can be used as a fuel or a raw material for the synthesis of vinyl chloride or methanol.

The cracking reaction in the second reactor is preferably carried out at a temperature of $150°$ C. to $800°$ C. and under a reduced pressure or a pressure of 0 to 20 kg./cm.$^2$(gauge). In case the temperature is high, a formation of tarry matter is observed and in case the temperature is low, the reaction velocity is slow and thus it is mostly benefitable to carry out the reaction at a temperature of $250°$ C. to $500°$ C.

Although the cracking reaction may be carried out in absence of catalyst, a catalyst such as metal fluorides for example aluminium fluoride is benefitable because the reaction temperature may be decreased and the side reaction such as the formation of tarry matter may be inhibited.

The present invention is illustrated but not limited by the following examples.

*Example 1*

A first reactor which was made of a stainless steel and provided with a pressure resistance jacket and previously charged with two liters of liquid hydrogen fluoride was blown in with a gaseous mixture containing 40 mol percent of ethylene, 20 mol percent of hydrogen, 17 mol percent of carbon monoxide, 10 mol percent of methane and 13 mol percent of carbon dioxide in the rate of 200 l./hr. and at the same time with anhydrous hydrogen fluoride in the rate of the equi mol. of ethylene, separately. A reaction was carried out at the temperature of 50° C. and under the pressure of 5 kg./cm.$^2$ (gauge). The conversion of ethylene into ethyl fluoride was 98%. The resultant gaseous mixture was passed through a stainless cooler which was cooled to —20° C. under the pressure of 4 kg./cm.$^2$ (gauge) to separate anhydrous hydrogen fluoride, and ethyl fluoride were separated from the gaseous mixture and then ethyl fluoride was separated from anhydrous hydrogen fluoride by a distillation. The separated hydrogen fluoride was recycled to the first reactor and used for the reaction of it with ethylene therein.

Ethyl fluoride thus obtained was decomposed in a second stainless reactor at the temperature of 400° C. and under the normal pressure to obtain ethylene and anhydrous hydrogen fluoride. The gaseous mixture thus obtained was cooled to —10° C. to liquefy a hydrogen fluoride, and the liquid anhydrous hydrogen fluoride was separated from ethylene. The obtained anhydrous hydrogen fluoride was also recycled to in the first reactor and used for the reaction of it with ethylene therein. The conversion of ethyl fluoride into ethylene was 97.5%.

*Example 2*

A first reactor was blown in with a raw gaseous mixture which was obtained by purifying a thermally-cracked gas of petroleum naphtha with a solvent and which had the following composition in the rate of 200 l./hr.

| | Mol. percent |
|---|---|
| Hydrogen | 32.4 |
| Methane | 9.6 |
| Acetylene | 8.0 |
| Ethylene | 10.0 |
| Carbon monoxide | 26.5 |
| Carbon dioxide | 13.0 |

The first reactor was previously charged with 2 l. of liquid hydrogen fluoride and on the other hand was blown in with hydrogen fluoride gas in quantity of equi mol. of ethylene and then the reaction was carried out at the temperature of 90° C. and under the pressure of 20 kg./cm.$^2$(gauge).

The conversion percentage of ethylene was 98.6% and thus the gases other than ethylene in the raw gaseous mixture were not reacted under the reaction condition and only ethylene was reacted to form ethyl fluoride.

The formed gaseous mixture thus obtained was passed through a stainless cooler which was cooled to —30° C. under the pressure of 4 kg./cm.$^2$ and thus the liquefied ethyl fluoride and hydrogen fluoride were separated from the gaseous mixture and then ethyl fluoride was separated from hydrogen fluoride by a distillation. The ethyl fluoride thus obtained was passed through a stainless tubular reactor which was filled with a catalyst comprising mainly iron fluoride and was decomposed at the temperature of 350° C. and under the normal pressure. The formed ethylene was separated from anhydrous hydrogen fluoride as similar to Example 1. The recovering percentage of ethylene was reached to 98%.

What we claim is:

1. A process for the separation and purification of ethylene from gaseous mixture containing ethylene which is reacted with hydrogen fluoride to form ethyl fluoride, the ethyl fluoride formed is separated from the gaseous mixture, the ethyl fluoride separated is thermally decomposed into ethylene and hydrogen fluoride and then the ethylene is recovered and also the hydrogen fluoride is recyclicly used for the above reaction of the gaseous mixture with hydrogen fluoride.

2. A process according to claim 1, wherein the gaseous mixture containing ethylene is the thermally cracked gaseous mixture containing acetylene, ethylene, methane, hydrogen, carbon monoxide, carbon dioxide and higher acetylenic and olefinic hydrocarbons.

3. A process according to claim 1 wherein the gaseous mixture containing ethylene is reacted with hydrogen fluoride at a temperature of —30° C. to 150° C. and under a pressure of 0 to 30 kg./cm.$^2$(gauge) by continuously contacting the mixture with anhydrous hydrogen fluoride in the presence of the quantity of more than 5 mol. of it per ethylene to effect the reaction of ethylene and hydrogen fluoride.

4. A process according to claim 1 wherein the thermally-cracking of ethyl fluoride is carried out at a temperature of 150° C. to 800° C.

5. A process for the separation and purification of ethylene from gaseous mixture containing ethylene and produced by the thermal cracking of hydrocarbons substantially as described with reference to the foregoing examples.

References Cited

UNITED STATES PATENTS

| 2,622,108 | 12/1952 | Block et al. | 260—677 |
| 3,274,273 | 9/1966 | Lester et al. | 260—677 |

DELBERT E. GANTZ, *Primary Examiner.*

A. D. SULLIVAN, *Examiner.*